(12) United States Patent
Kuang et al.

(10) Patent No.: US 12,353,795 B2
(45) Date of Patent: Jul. 8, 2025

(54) ASSISTANT ADAPTATION OF GRAPHICAL USER INTERFACE TO GUIDE INTERACTION WITH USER IN FULFILLING USER REQUEST

(71) Applicant: GOOGLE LLC, Mountain View, CA (US)

(72) Inventors: Cliff Kuang, San Francisco, CA (US); Jonathan Lee, Brooklyn, NY (US); Andy Gugel, Eden Prairie, MN (US); Jesse Kaczmarek, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 148 days.

(21) Appl. No.: 17/946,871

(22) Filed: Sep. 16, 2022

(65) Prior Publication Data

US 2024/0020091 A1    Jan. 18, 2024

Related U.S. Application Data

(60) Provisional application No. 63/388,396, filed on Jul. 12, 2022.

(51) Int. Cl.
*G10L 15/22*      (2006.01)
*G06F 3/048*      (2013.01)
(Continued)

(52) U.S. Cl.
CPC .............. *G06F 3/167* (2013.01); *G06F 3/048* (2013.01); *G10L 15/1815* (2013.01);
(Continued)

(58) Field of Classification Search
None
See application file for complete search history.

(56) References Cited

U.S. PATENT DOCUMENTS 8,155,959 B2 *  4/2012  Weng ................... H04M 3/493
                                                         379/267
10,496,705 B1 * 12/2019  Irani ................. G06F 16/90328
(Continued)

OTHER PUBLICATIONS

European Patent Office; International Search Report and Written Opinion issued in Application No. PCT/US2022/080231; 13 pages; dated Apr. 6, 2023.
(Continued)

*Primary Examiner* — Richard Z Zhu
(74) *Attorney, Agent, or Firm* — Gray Ice Higdon

(57) ABSTRACT

Implementations set forth herein relate to an automated assistant that can proactively identify and complete tasks that may be associated with an activity with which a user has scheduled the automated assistant to assist with. The tasks can be identified and completed prior to a time that the user has scheduled the automated assistant to assist the user, thereby eliminating certain manual tasks the user may otherwise perform at the scheduled time. When the activity involves communicating with a separate entity, such as another person and/or organization, the automated assistant can initialize communication with the entity prior to the scheduled time that the user requested assistance. A customized GUI can be rendered at an assistant-enabled device to provide the user with an ongoing status of completing various tasks associated with scheduled activity.

14 Claims, 11 Drawing Sheets

(51) Int. Cl.
*G06F 3/16* (2006.01)
*G10L 15/18* (2013.01)
*G10L 15/183* (2013.01)
*G06F 3/0482* (2013.01)

(52) U.S. Cl.
CPC ............ *G10L 15/183* (2013.01); *G10L 15/22* (2013.01); *G06F 3/0482* (2013.01); *G10L 15/1822* (2013.01); *G10L 2015/221* (2013.01); *G10L 2015/223* (2013.01); *G10L 2015/227* (2013.01); *G10L 2015/228* (2013.01)

(56) References Cited

U.S. PATENT DOCUMENTS

| | | | | |
|---|---|---|---|---|
| 10,552,204 | B2* | 2/2020 | Ni | G06F 40/205 |
| 11,256,390 | B2* | 2/2022 | Ni | H04L 12/282 |
| 11,720,325 | B2* | 8/2023 | Lange | G10L 15/22 704/275 |
| 11,848,013 | B2* | 12/2023 | Davies | G06F 3/167 |
| 12,027,164 | B2* | 7/2024 | Barros | G06F 16/90332 |
| 12,118,994 | B2* | 10/2024 | Natarajan | G06F 3/167 |
| 2019/0012198 | A1* | 1/2019 | Ni | G06F 9/4843 |
| 2020/0342861 | A1* | 10/2020 | Ni | H04L 67/535 |
| 2020/0342865 | A1* | 10/2020 | Davies | G10L 15/22 |
| 2020/0357395 | A1* | 11/2020 | Mirelmann | G10L 15/083 |
| 2020/0380973 | A1* | 12/2020 | Novitchenko | G06F 40/35 |
| 2020/0395018 | A1* | 12/2020 | Burakov | G10L 15/26 |
| 2020/0410994 | A1* | 12/2020 | Burris | G07F 9/009 |
| 2022/0083908 | A1 | 3/2022 | Sharifi et al. | |
| 2022/0366908 | A1* | 11/2022 | Takahashi | G10L 15/22 |
| 2022/0406301 | A1* | 12/2022 | Barros | G10L 15/22 |

OTHER PUBLICATIONS

Lee et al., "Moonbow Patent Submissions" DYNA. 50 pages.

Kuang et al., "Affordance for Presenting and Suggesting Semantically Related Actions to Content Cards on Screen, and Intelligently Composing Third-Party Actions" 11 pages, dated Aug. 20, 2021.

* cited by examiner

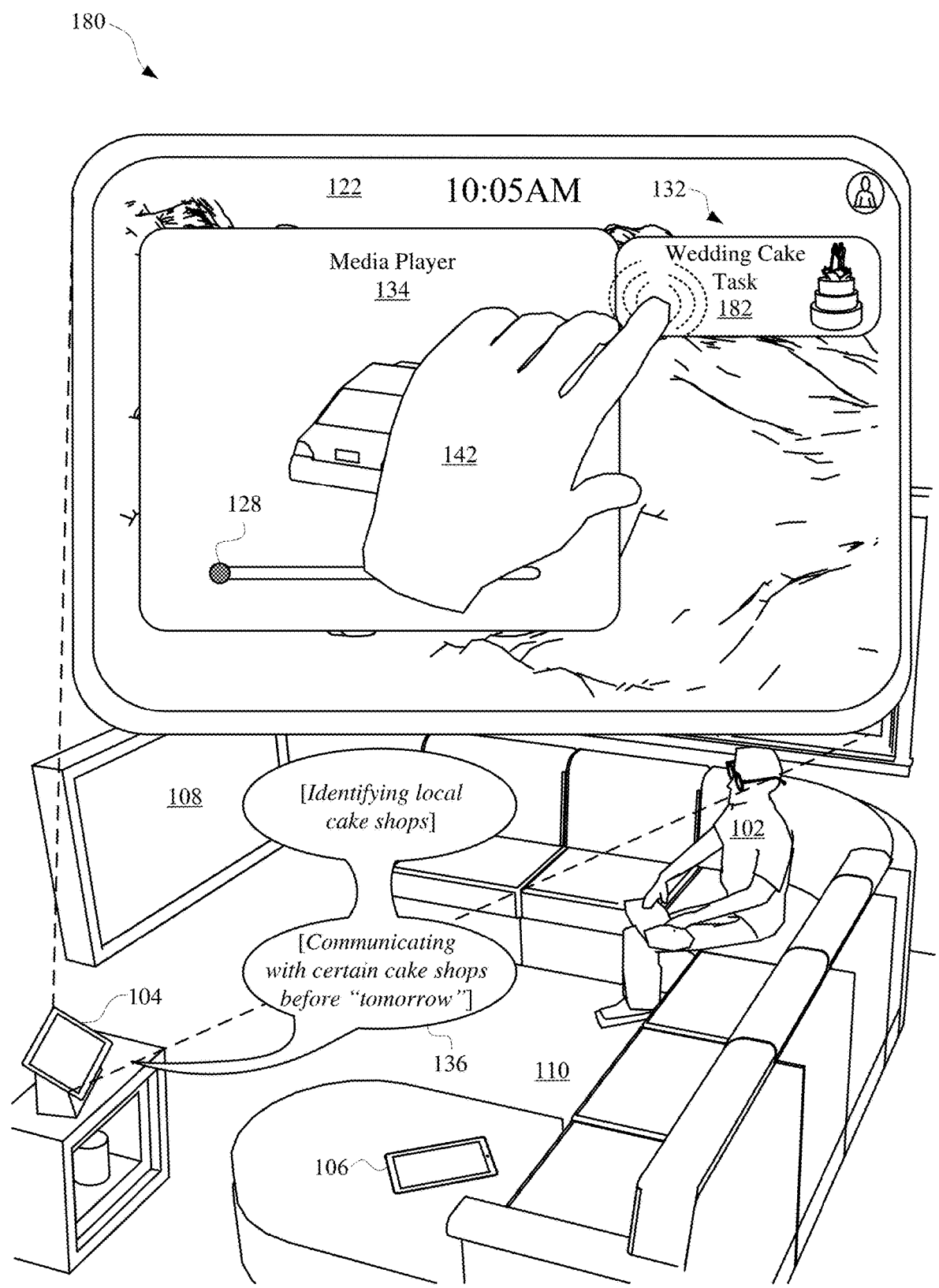
FIG. 1E1

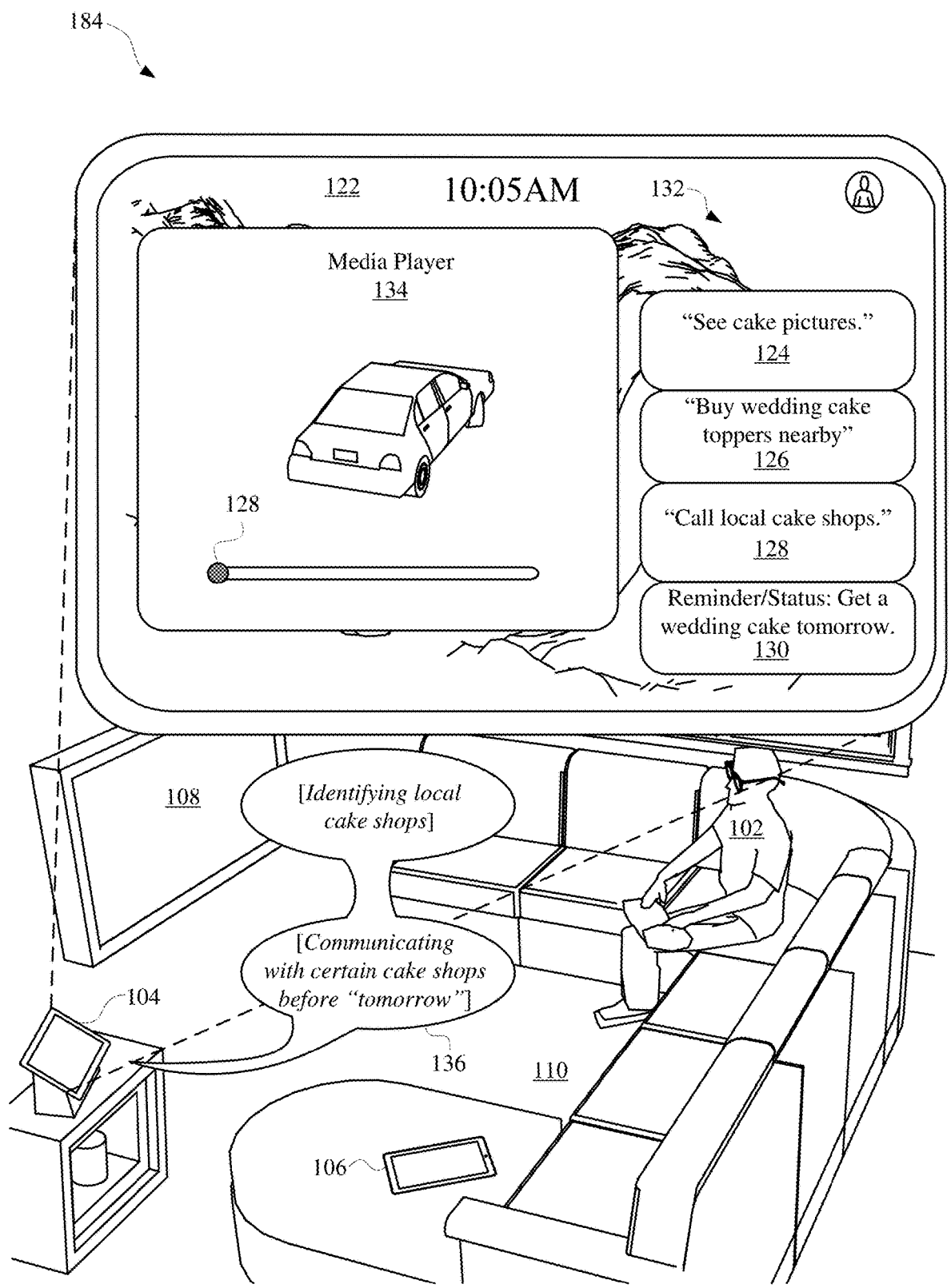
FIG. 1E2

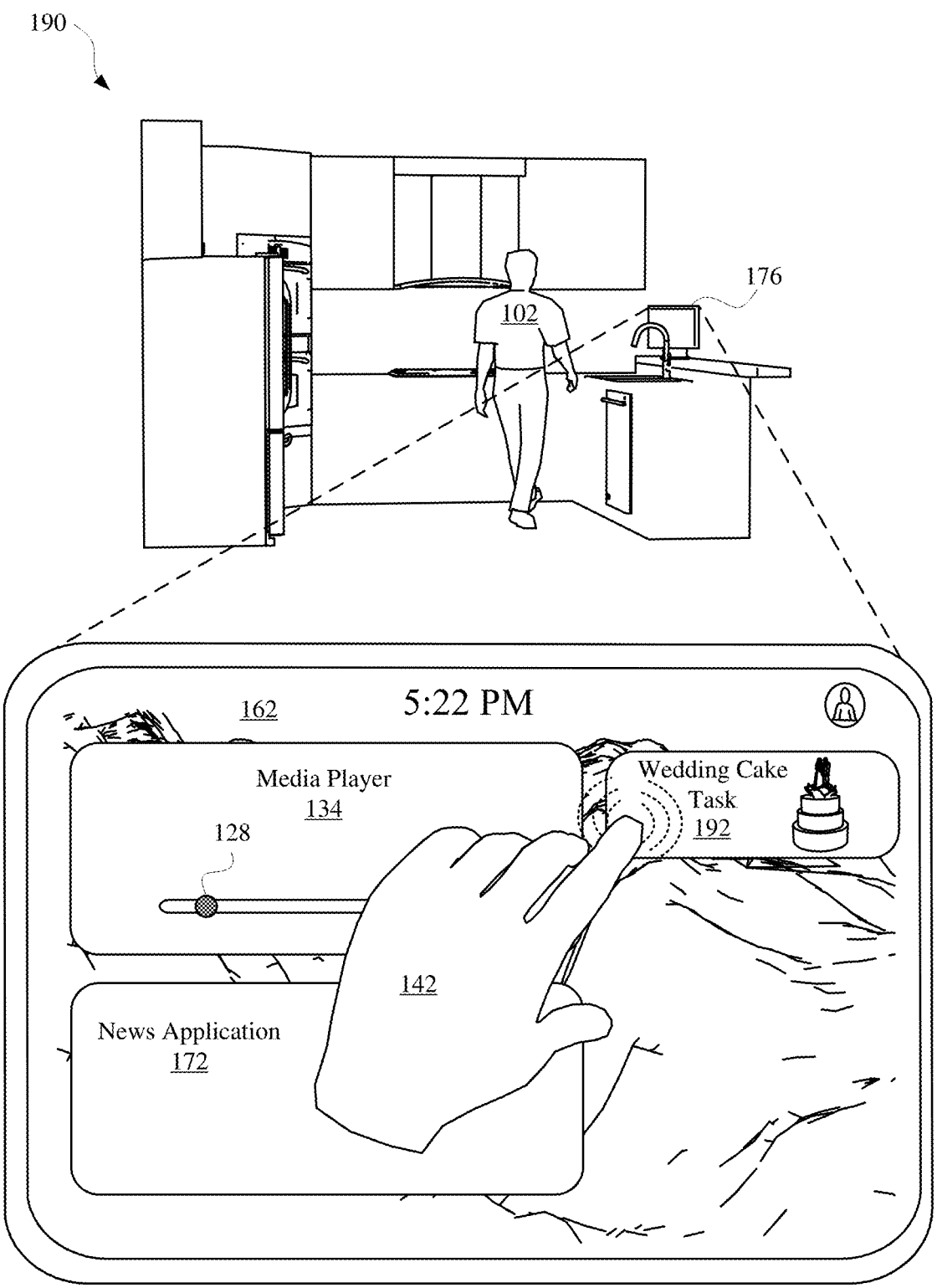
*FIG. 1F1*

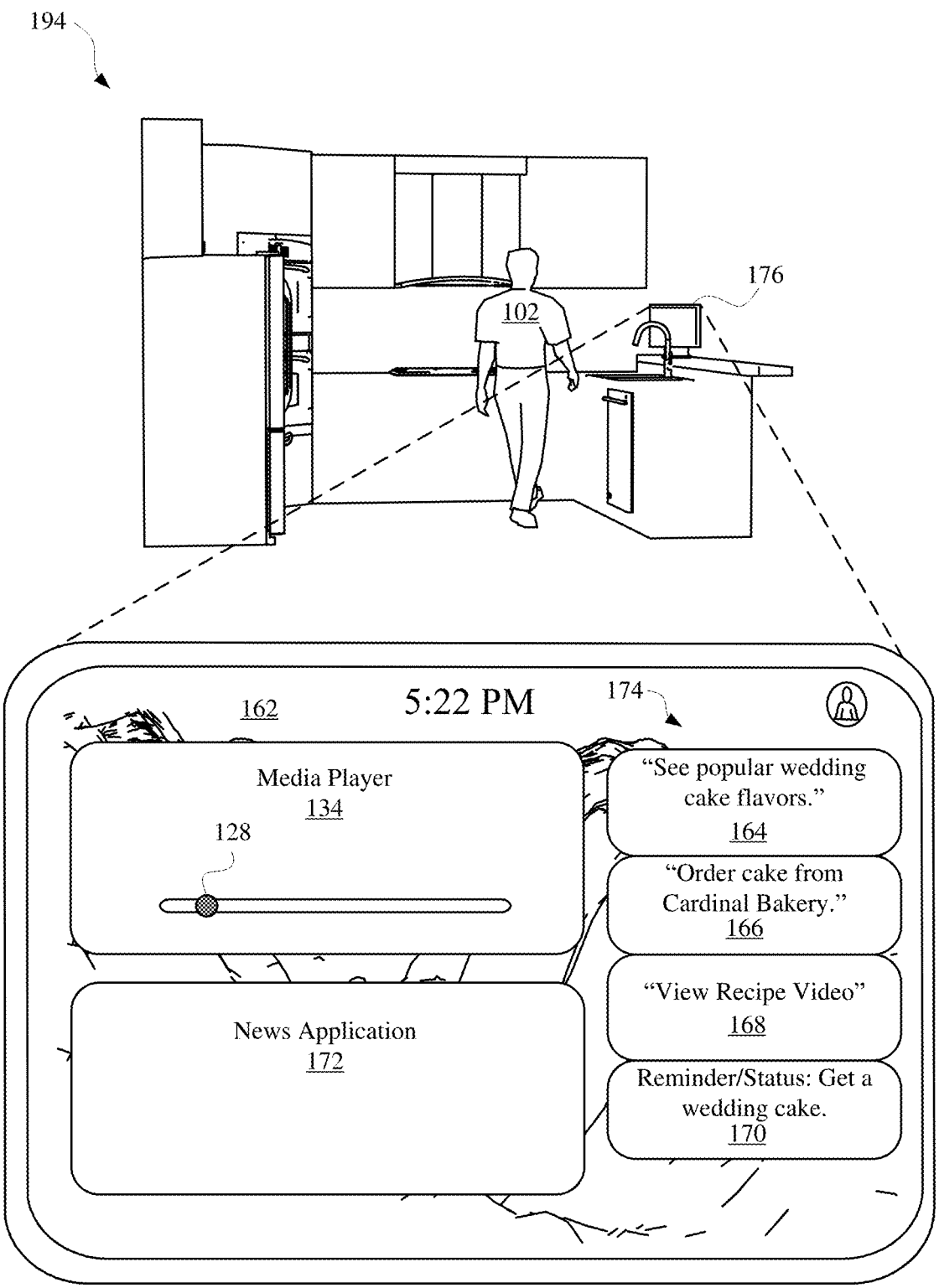
*FIG. 1F2*

ASSISTANT ADAPTATION OF GRAPHICAL USER INTERFACE TO GUIDE INTERACTION WITH USER IN FULFILLING USER REQUEST

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Automated assistants are often utilized to handle quick tasks that a user may otherwise handle via their personal computing device (e.g., cell phone, laptop, etc.). For instance, a user may request that their automated assistant set a reminder for the following day, and—in response, the automated assistant can generate a calendar entry that can be stored by a calendar application on their personal computing device. Although such interactions can save time for the user, the user may nonetheless manually perform other tasks that may be associated with the reminder—and those tasks may also involve interactions between the user and their devices. For example, a user may invoke their automated assistant to set a reminder regarding "scheduling a plumber," which may involve the user searching various applications for plumbing services and calling each search result to schedule an available plumber. However, when the automated assistant initializes to render the reminder, the automated assistant may only repeat the express request from the user (e.g., "Schedule a plumber.") without any supplemental data and/or assistance with the subject of the reminder (e.g., assistance with scheduling a plumber). As a result, some interactions with the automated assistant can be duplicative and waste computational resources—especially in situations in which the user immediately invokes the automated assistant (e.g., "Assistant, call my plumber.") and/or another application for help after acknowledging a reminder from the automated assistant.

SUMMARY

Implementations set forth herein relate to an automated assistant that can provide an adaptive graphical user interface (GUI) in response to a user request related to certain tasks. The adaptive GUI can update dynamically according to data that can be made available to the automated assistant from one or more other applications and/or devices, in furtherance of eliminating duplicative tasks that may be associated with certain reminders and/or other requests. For example, a user can provide a request for the automated assistant to set a reminder for the user to perform an activity that can involve multiple different tasks. The request can be embodied in a spoken utterance such as, "Assistant, remind me to bake bread tomorrow." This request can refer to an activity of baking bread, which can typically involve multiple tasks such as: finding bread recipes, ensuring all ingredients are available, scheduling a time to prepare the recipe, and finally preparing the bread. Therefore, in response to the automated assistant receiving the spoken utterance, the user can be presented with multiple different reminders and/or options for completing the tasks over the time period that the user requested (e.g., from the moment the user provides the spoken utterance through "tomorrow").

For example, in response to receiving the spoken utterance, the automated assistant can identify one or more tasks that may be associated with the request embodied in the spoken utterance. The tasks can be identified using one or more heuristic processes and/or one or more trained machine learning models. In some implementations, the automated assistant can process data from one or different sources of data (e.g., the internet, one or more other applications, instructional videos, etc.) to determine a number of tasks that may be involved for fulfilling the request. The data can be processed to identify certain sources of data and/or instances of data that may be particularly reliable (e.g., as determined by crowdsourcing, data content, data organization, etc.) for identifying steps for completing a particular task. Alternatively, or additionally, the data from the different sources of data can be processed using one or more trained machine learning models (e.g., trained using supervised learning, and/or another training process) for generating a list of actions for a particular task.

When the list of actions is generated for the particular task (e.g., reminding a user to make bread), the automated assistant can render a customized GUI for initializing performance of certain tasks. For example, the user can have a standalone display device in a kitchen of their home, and the automated assistant can render the customized GUI at a display interface of the standalone display device the day after receiving the spoken utterance. The customized GUI can include multiple different selectable GUI elements that can correspond to each identified task for the request embodied in the spoken utterance. In some implementations, one or more of the selectable GUI elements can be rendered based on data that has been preemptively generated in response to the spoken utterance.

For example, the customized GUI can include a selectable link to a particular bread recipe that has been selected by the automated assistant based on contextual data indicating that the user may prefer that particular bread recipe. Alternatively, or additionally, the customized GUI can include a selectable link to a particular shopping application that has been selected by the automated assistant based on the automated assistant determining, via the shopping application, availability of certain ingredients for the particular recipe. In some implementations, the customized GUI can be dynamically adapted according to contextual data and/or other data that is processed subsequent to the spoken utterance being provided by the user and/or subsequent to the customized GUI being rendered.

For example, the automated assistant can render the customized GUI during the following morning (e.g., following the day that the user provided the spoken utterance), and the customized GUI can include the selectable link to the shopping application. However, subsequent to the customized GUI being rendered for the user, the user may order groceries from a grocery application, which is different from the shopping application, and grocery data characterizing the purchased groceries can be made available to the automated assistant, with prior permission from the user. When the grocery data indicates that the user purchased one or more ingredients that the automated assistant determined the user did not previously have for making bread, the automated assistant can cause the customized GUI interface to dynamically update. In this way, the user will not be reminded of certain tasks that may have already been completed—even though the user did not expressly indicate their completion to the automated assistant. This can preserve time and resources that might otherwise be consumed rendering comprehensive reminders about tasks that may be irrelevant over time.

In some implementations, the selectable link for the shopping application can be removed from, and/or modified at, the customized GUI interface. For example, if the automated assistant determines that all of the ingredients are now owned by the user, the automated assistant can cause the selectable element for the shopping application to be removed from the customized GUI interface. However, if the automated assistant determines that one or more of the ingredients still need to be purchased by the user, the automated assistant can modify the selectable element. For example, the selectable element at the customized GUI can initially include content such as "Buy cinnamon and yeast with shopping application," and can also be associated with a deep link that, when selected, adds "cinnamon" and "yeast" to a digital shopping cart of the shopping application. However, subsequently and based on the grocery data, the selectable element can be modified by the automated assistant to include content such as "Buy yeast with the shopping application," (without the cinnamon) and be associated with a different deep link that, when selected, adds "yeast" to a digital shopping cart of the shopping application, instead of both "yeast" and "cinnamon."

In some implementations, the customized GUI rendered in response to a user request can be dynamically updated according to interactions between the automated assistant and one or more other entities (e.g., other person(s), organization(s), device(s), application(s), etc.). For example, the user can provide a request for assistance regarding a home repair by providing, to the automated assistant, a spoken utterance such as, "Assistant, help me repair my furnace tomorrow." In response, the automated assistant can identify one or more tasks that a user may typically seek to accomplish in furtherance of fulfilling the request. For example, the automated assistant can identify one or more tasks such as: calling an HVAC company, and finding helpful instructional videos on the internet. The following day, the automated assistant can cause a customized GUI interface to be rendered at a display interface of an assistant-enabled device, such as a standalone display device in a living room of a home of the user.

For example, prior to normal operating hours of HVAC companies, the customized GUI interface can render a reminder to "Call HVAC companies" and a selectable element that links to instructional HVAC repair videos identified by the automated assistant. When the current time reaches normal operating hours for HVAC companies, the automated assistant (with prior permission from the user) can interact with a variety of different HVAC companies via one or more assistant protocols. For example, the automated assistant can access a chat module of a first HVAC company to schedule a time to meet the user, and place an assistant phone call to a second HVAC company to schedule another time to meet the user. The automated assistant can schedule a particular HVAC company depending on: which company is available that day, an expected preference of the user, crowd-sourced data about each company, and/or any other information that can be helpful for determining whether to schedule a particular service.

Depending on a result of the interactions between the automated assistant and the HVAC companies, the automated assistant can cause the customized GUI to be updated. For example, when an interaction between the first HVAC company and the automated assistant results in first HVAC company being scheduled to arrive that day at 3:00 PM, the customized GUI interface can be updated to indicate the scheduled arrival (e.g., "First HVAC is arriving at 3:00 PM."). Alternatively, or additionally, the automated assistant can update the customized GUI interface to include additional content that may be determined based on the interaction between the automated assistant and the first HVAC company. For example, during the interaction between the first HVAC company and the automated assistant, the first HVAC company can indicate that the user should "shut off their HVAC system" prior to arrival of the first HVAC company. Based on this indication, the automated assistant can update the customized GUI interface to remind the user to shut off their HVAC system prior to the appointment time of 3:00 PM.

Alternatively, or additionally, the automated assistant can interact with an IoT application, with prior permission from the user, to automatically shut off the HVAC system at the home of the user prior to the 3:00 PM appointment (e.g., the automated assistant can shut off the HVAC system at 2:55 PM). In such instances, the automated assistant can modify the customized GUI interface to indicate that the automated assistant will utilize the IoT application to shut off the HVAC system before 3:00 PM. Alternatively, or additionally, the automated assistant can cause the customized GUI interface to be updated to include a selectable element that, when selected, causes the automated assistant to interact with the IoT application to shut off the HVAC system. Alternatively, or additionally, the selectable element can include natural language content such as, "Shut off HVAC system with IoT application," thereby indicating that the automated assistant will shut off the HVAC system in response to the user selecting the selectable element. In this way, that automated assistant can proactively assist with tasks related to reminders and/or other requests that the user may submit to the automated assistant. This can preserve time and resources by inferring certain tasks and attempting to complete such tasks when a user may be unable to because of their limited schedule and/or availability.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 1A, FIG. 1B, FIG. 1C, and FIG. 1D, FIG. 1E1, FIG. 1E2, FIG. 1F1, and FIG. 1F2 illustrate respective views of an automated assistant dynamically rendering a customized GUI that indicates statuses for tasks that the automated assistant may be undertaking to assist with an activity.

FIG. 2 illustrates a system that provides an automated assistant for proactively identifying and completing tasks associated with a scheduled activity, and rendering a customized GUI that indicates a status of any ongoing tasks.

DETAILED DESCRIPTION

Figure 1A:
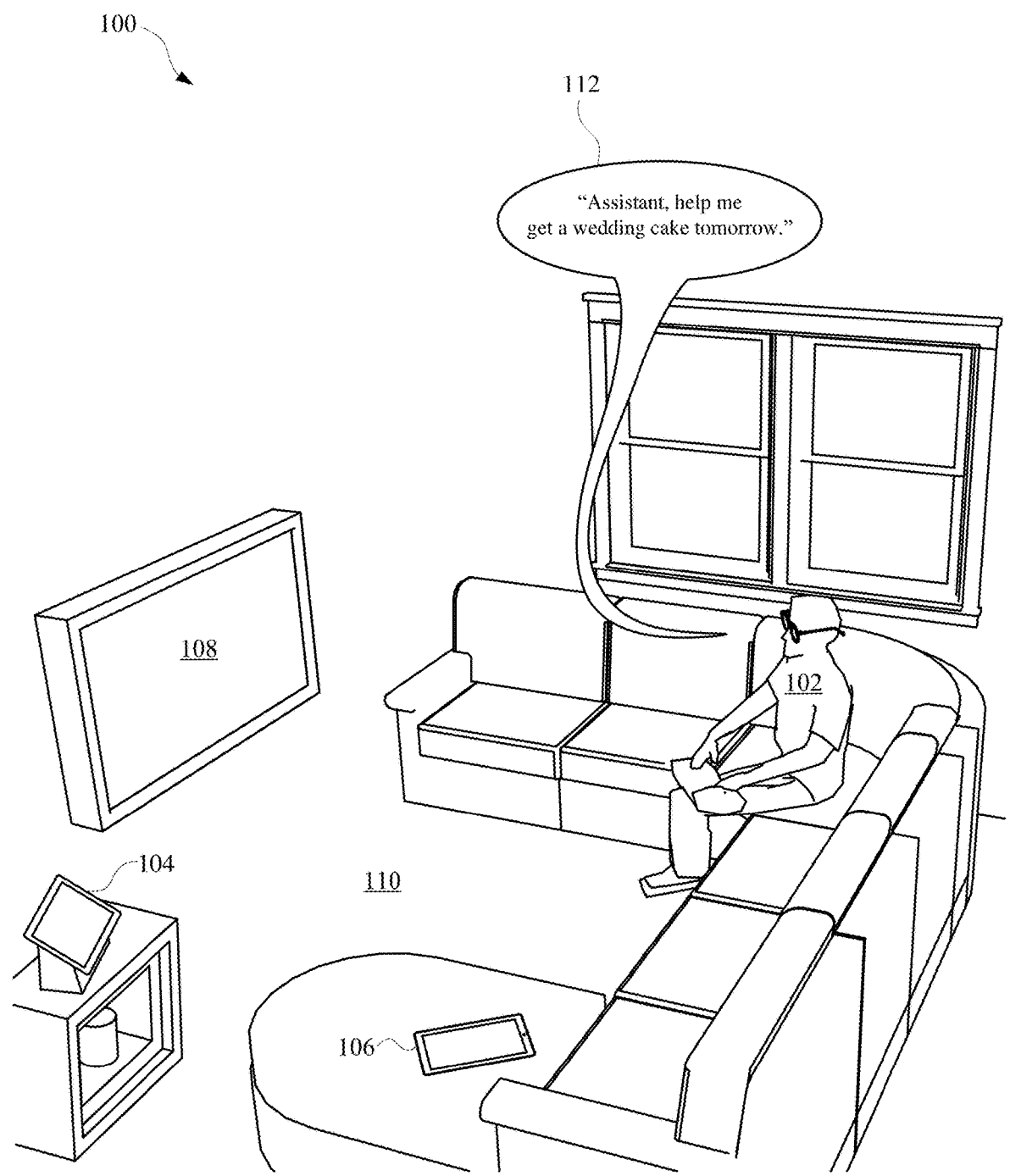

FIG. 1A, FIG. 1B, FIG. 1C, FIG. 1D, FIG. 1E1, FIG. 1E2, FIG. 1F1, and FIG. 1F2 illustrate a view 100, a view 120, a view 140, view 160, a view 180, a view 184, a view 190, and a view 194, respectively, of an automated assistant dynamically rendering a customized GUI that indicates statuses for tasks that the automated assistant may be undertaking to assist with an activity. The user 102 can request assistance with the activity during a subsequent instance of time, and the automated assistant can assist with certain tasks of the activity between the time that the user 102 provides the request and the subsequent instance of time that the user 102 specified. For example, the user 102 can provide a spoken utterance 112 to an automated assistant, which can be accessible via a computing device 104 located in a living room 110 of a home of the user 102. The spoken utterance 112 can be, for example, "Assistant, help me get a wedding cake tomorrow." The automated assistant can process audio data corresponding to the spoken utterance 112 to determine that the user 102 is requesting to be reminded to perform a particular activity tomorrow (e.g., "get a wedding cake"), and/or is requesting for assistance with performing the particular activity tomorrow.

In some implementations, when the automated assistant determines that the user 102 is requesting assistance with an activity, the automated assistant can determine whether the activity is associated with other tasks that—if completed, will assist with fulfilling the request from the user 102. In some implementations, data from one or more different sources can be processed using one or more heuristic processes and/or one or more trained machine learning models to identify one or more tasks associated with an activity. For example, content accessed by the user 102 and/or one or more other users can be processed, with prior permission from the user(s) to identify particular instances of content that can identify a task that may be associated with the requested activity. For example, video and/or audio being rendered via a display device 108 and/or a portable device 106 can indicate that a particular activity (e.g., getting a wedding cake) can involve certain tasks (e.g., selecting a design, buying a wedding topper, contacting local bake shops, etc.). Alternatively, or additionally, certain tasks can be identified by processing data from one or more different webpages and/or application interfaces to identify, rank, and/or order tasks that may be identified by other users as being associated with the identified activity.

Figure 1B:
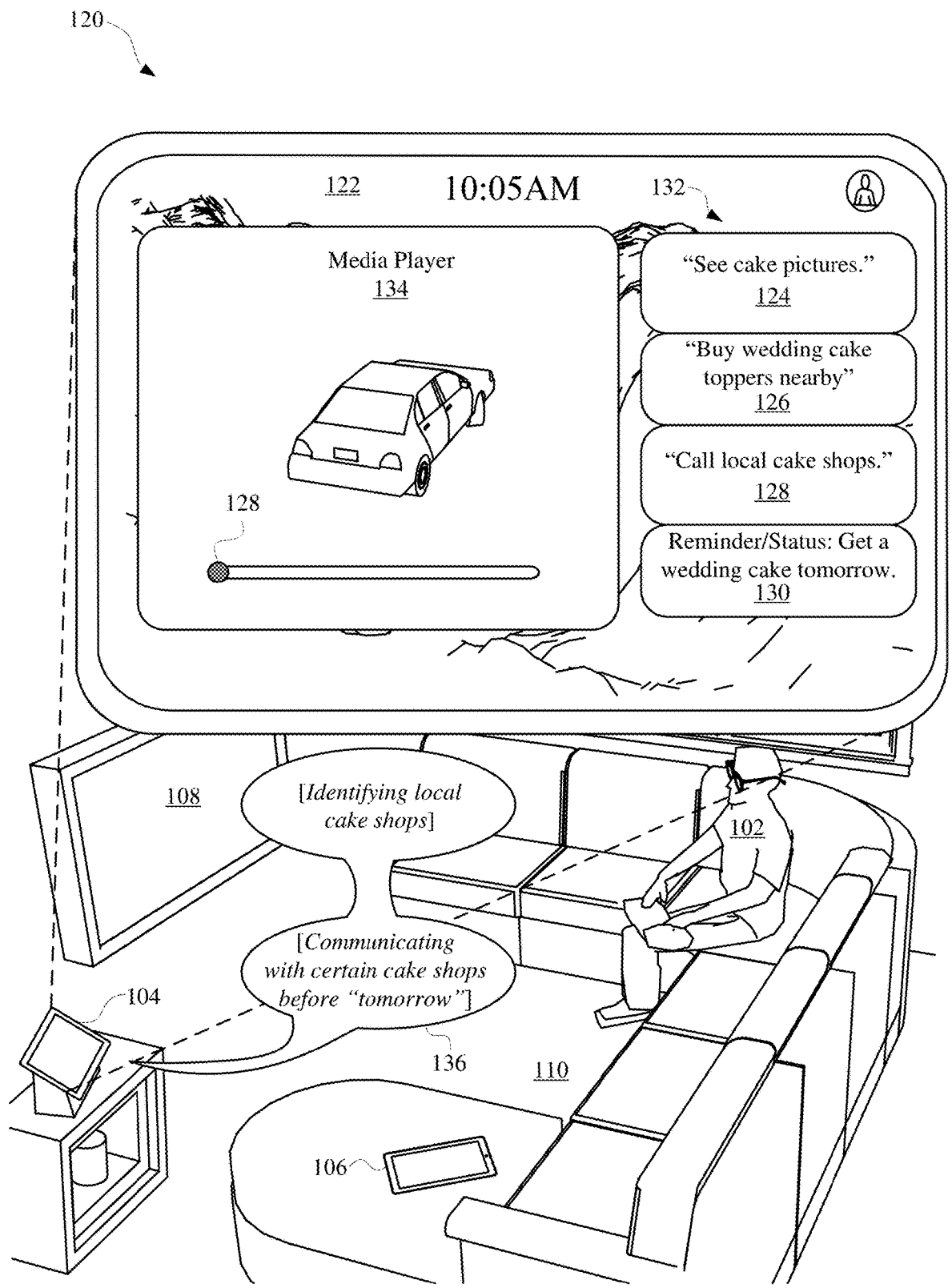
Figure 1C:
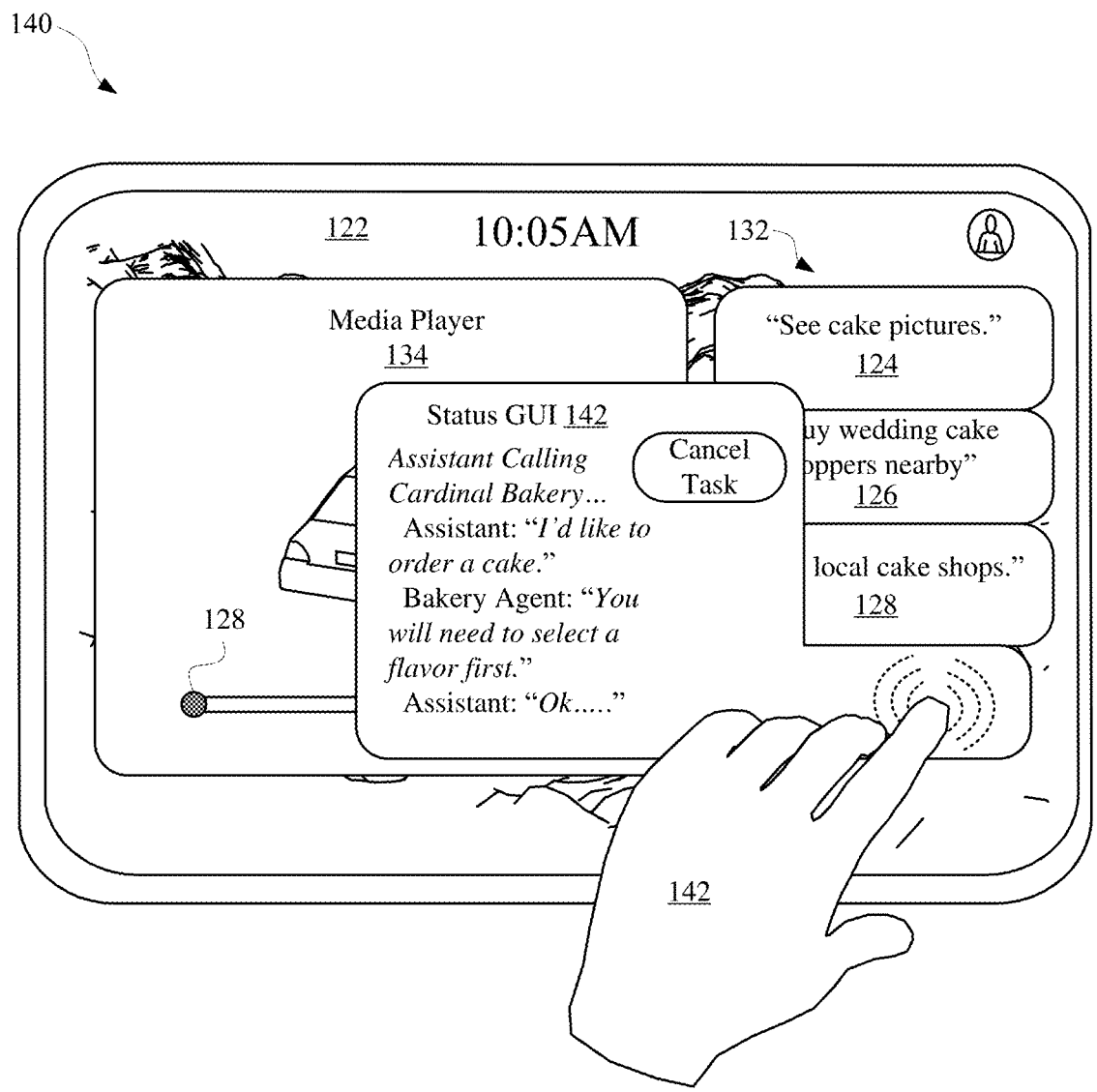
Figure 1D:
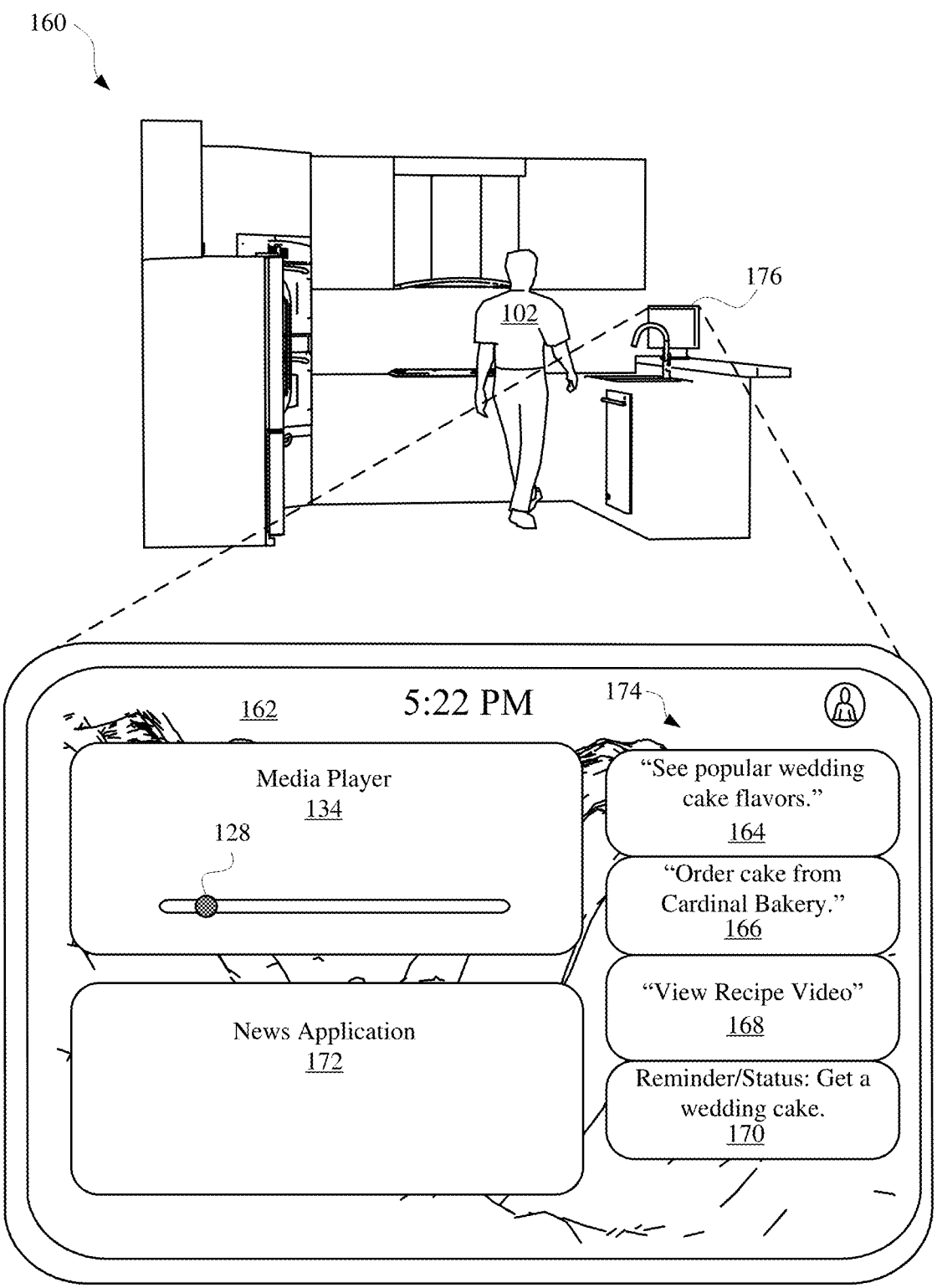

Subsequent to the user 102 providing the spoken utterance 112, the automated assistant can cause a customized GUI 132 to be rendered at a display interface 122 of the computing device 104, as illustrated in FIG. 1B. Alternatively, or additionally, the automated assistant can cause a selectable element 182 to be rendered at the display interface 122, as illustrated in FIG. 1E1. In some implementations, the customized GUI 132 can be rendered simultaneous to one or more other application interfaces (e.g., a media player 134 with a status indicator 128) being rendered at the display interface 122. In this way, the user 102 can put on notice about tasks that the automated assistant may be assisting with and/or tasks that the user 102 may wish to start in furtherance of performing the activity. For example, a few minutes after the user 102 provides the spoken utterance 112, the automated assistant can cause the customized GUI 132 to be rendered with one or more selectable elements. For example, and as illustrated in FIG. 1B, the customized GUI 132 can include a first selectable element 124 to "See cake pictures," a second selectable element 126 to "Buy wedding cake toppers nearby," a third selectable element 128 to "Call local cake shops," and a fourth selectable element 130 that is a reminder to "Get a wedding cake tomorrow." Alternatively, and as illustrated in view 180 of FIG. 1E1, the customized GUI 132 can include a selectable element 182 that, when selected by the user 102, causes other selectable elements to be rendered, as illustrated in view 184 of FIG. 1E2.

Each of the selectable elements can correspond to a task that the automated assistant has determined is associated with the activity that the user 102 requested assistance with. In some implementations, the user 102 can select a particular selectable element to cause the automated assistant to initialize performance of one or more operations of fulfilling the corresponding task. For example, the user 102 can provide an input gesture (e.g., a tap gesture with their hand 142) to the computing device 104 at the first selectable element 124 to cause the automated assistant to employ a search engine to find "cake pictures," and render the search results at the display interface 122. However, in some implementations, the automated assistant can operate to complete one or more tasks associated with the activity without express user input and/or direct input to the automated assistant subsequent to the user 102 asking for assistance (e.g., providing the spoken utterance 112).

For example, prior to the instance of time that the user 102 requested assistance (e.g., "tomorrow") the automated assistant can initialize performance of one or more operations in furtherance of completing one or more tasks associated with the activity (e.g., "Getting a wedding cake."). For instance, the automated assistant can proactively identify one or more images that the user 102 may prefer for a cake, thereby furthering completion of the task associated with the first selectable element 124. Alternatively, or additionally, the automated assistant can identify a local store that sells "wedding cake toppers" and add this item to a digital shopping cart of a shopping application that the user 102 prefers to use, thereby furthering completion of the task associated with the second selectable element 126. Alternatively, or additionally, the automated assistant can initialize communication(s) with one or more local entities (e.g., local cake shops) in furtherance of completing a task associated with the third selectable element 128. As the automated assistant initializes performance of certain tasks, a status of the initialized tasks can be indicated at each respective custom GUI 132.

For example, subsequent to the user 102 providing the spoken utterance 112 but prior to the instance of time that the user 102 requested assistance (e.g., "tomorrow"), the automated assistant can perform one or more operations 136 such as "identifying local cake shops" and "communicating with certain cake shops." In some implementations, content of the communications can be based on the one or more tasks that may be associated with the activity identified by the user 102. For example, the automated assistant can initialize communication(s) with a local cake shop via audio communications, textual communications, and/or another modality (e.g., via an API of an application associated with the entity). Content of the communications can include queries, from the automated assistant to the entity, regarding whether certain items (e.g., "wedding cake toppers") are available and/or the operating hours of the entity during the instance of time (e.g., "tomorrow") that the user 102 requested assistance. When the automated assistant identifies additional data, and/or completes a task, associated with the activity, the automated assistant can cause the customized GUI 132 to be updated according to the additional data and/or based on any result of completing the task. In some implementations, when the selectable element 182 is rendered, updates to tasks can be rendered in response to the user 102 selecting the selectable element 182. For example, the customized GUI 132 of FIG. 1E2 can be rendered differently when the user 102 selects the selectable element 182, compared to when the user 102 selects a selectable element 192 of FIG. 1F1, which results in the updated customized GUI 174 of FIG. 1F2 being rendered. Such differences can reflect the changes to statuses of certain tasks and/or operations being performed by the automated assistant between a time corresponding to FIG. 1E1 and/or FIG. 1A, and a time corresponding to FIG. 1F1 and/or FIG. 1B.

In some implementations, the customized GUI 132 can include a selectable element (e.g., the fourth selectable element 130) that, when selected by a user, can render a status of any actions taken by the automated assistant in furtherance of completing a task. For example, and as illustrated in view 140 of FIG. 1C, the user can use their hand 142 to tap on the fourth selectable element 130 to cause a status GUI element 142 to be rendered. The status GUI element 142 can be rendered with content that characterizes one or more tasks that the automated assistant is currently completing and/or has already completed. For example, the automated assistant can be undertaking a task associated with the third selectable element 128, such as calling a local bakery (e.g., "Calling Cardinal Bakery"). In some implementations, the user 102 can view a transcript of a progress of the communications between the automated assistant and the entity (e.g., the local bakery) and/or can control any actions the automated assistant may be currently taking. In this way, if the user 102 had already decided on a particular entity to contact without communicating this to the automated assistant, the user 102 can cancel any ongoing action that the automated assistant may be taking to complete this task.

Figure 2:
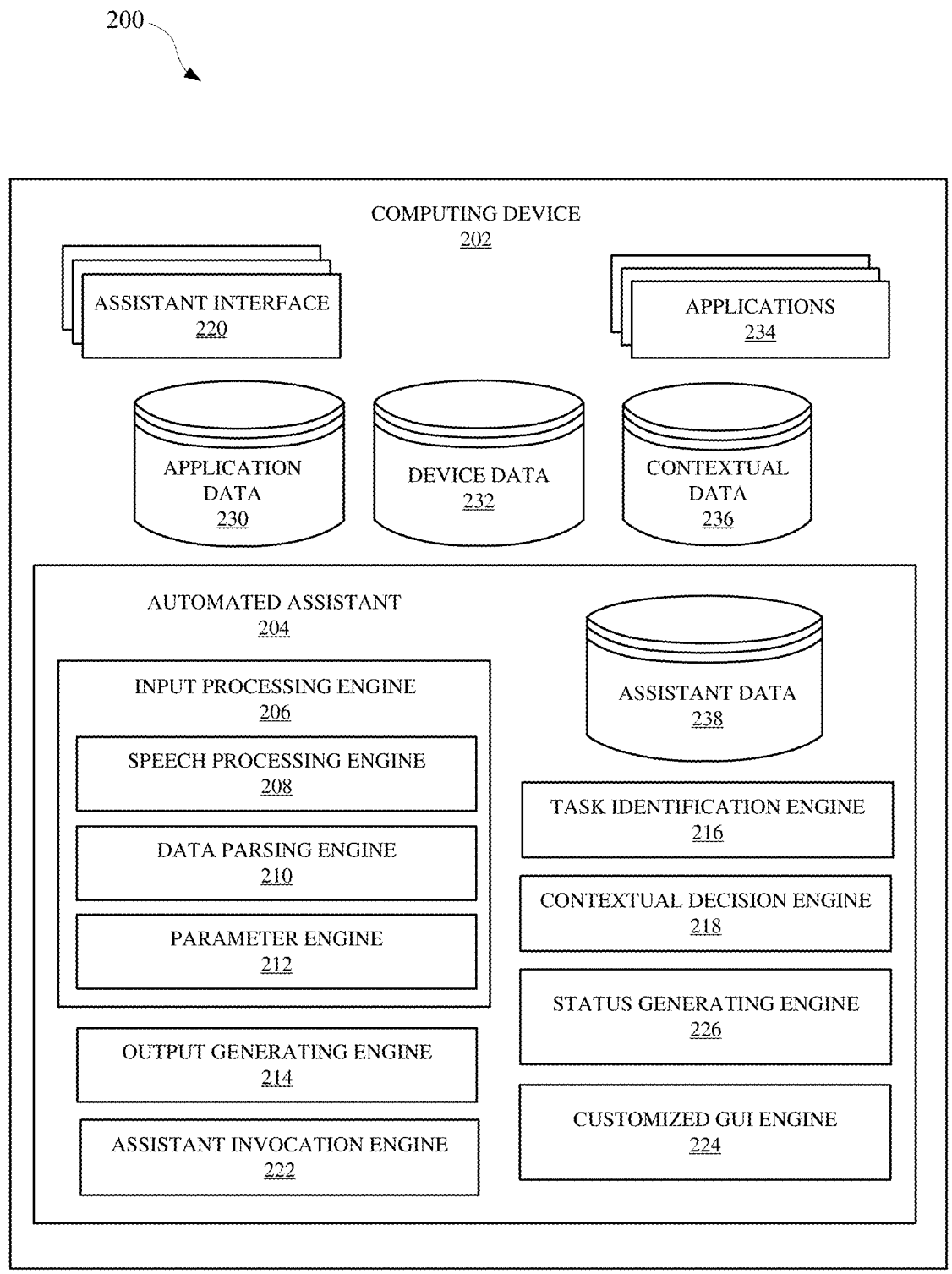

In some implementations, during, or prior to, the instance of time that the user 102 requested assistance, the automated assistant can render a disparate and/or updated customized GUI 174 at the computing device 104 and/or at a different display interface 176. The display interface 1162 can be integral to a different computing device 176 associated with the user 102, and the updated customized GUI 174 can be rendered simultaneous with other application interfaces (e.g., the media player 134 with the status indicator 128, and a news application 172). In some implementations, the automated assistant can render the updated customized GUI 174 based on operations performed in furtherance of completing any identified tasks associated with the activity. Alternatively, or additionally, the updated customized GUI 174 can be based on other tasks that may not have been previously rendered after the user 102 provided the spoken utterance 112. For example, a first selectable element 164 can be rendered for a task to "See popular wedding cake flavors," which can be rendered based on an entity (e.g., a local cake shopping) requesting that a cake flavor be selected. For instance, an incoming communication, to the automated assistant and from the "Cardinal Bakery," can include natural language content that embodies a request for the user 102 to be prepared to select a cake flavor when the user 102 orders from the "Cardinal Bakery." Alternatively, or additionally, the first selectable element 164 can be rendered with a task that was separately identified for the activity in response to the spoken utterance 112. Alternatively, or additionally, a third selectable element 168 can be rendered for a task to "View Recipe Video," which can correspond to a recipe that may have been identified by the automated assistant when performing the task associated with other first selectable element 164 (e.g., "See cake pictures). In some implementations, the updated customized GUI 174 may not be rendered until the user 102 selects the selectable element 192, as illustrated in FIG. 1F1 and FIG. 1F2.

In some implementations, the selectable element 192 and the selectable element 182 can be rendered with an indication of the request and/or tasks that the selectable element 182 and the selectable element 192 are associated with. For example, each selectable element can include natural language content and/or graphical content (e.g., a wedding cake) to indicate the request and/or task that each selectable element is related to. In this way, the user 102 can understand the purpose of each selectable element without each selectable element occupying more screen area. In some implementations, content of each selectable element can be rendered to indicate whether a status change has occurred for one or more tasks associated with the selectable element. For example, when an assistant call to another entity (e.g., a cake shop) has completed between a time corresponding to FIG. 1F1 and a time corresponding to FIG. 1E1, the selectable element 192 can appear differently from the selectable element 182. For example, a color, text, shading, graphics, and/or other feature of the selectable element 192 can appear different from the selectable element 182 based on a change to one or more statuses of tasks and/or operations, and/or based on information obtained during execution of the tasks and/or operations. The user 102 can then check the status and/or information by selecting the selectable element 192 at FIG. 1F1, and viewing the updated customized GUI 174 at FIG. 1F2.

In some implementations, a new task may be "spawned" from selecting the selectable element 192 compared to when the user 102 selects the selectable element 182 at a previous instance of time. For example, information obtained during a call between the automated assistant and a particular entity (e.g., Cardinal Bakery) can indicate that this particular entity is suitable for utilizing for completing a task (e.g., because the particular entity is open tomorrow while other entities are closed tomorrow). Based on this determination, the updated customized GUI 174 can be rendered dynamically with a new task, information, and/or selectable element for the user 102 to interact with depending on how a user context changes over time and/or depending on data obtained during certain assistant operations. In this way, the user 102 can be guided by the automated assistant to fulfill their requests more efficiently, by eliminating certain optional tasks that may futile in certain contexts (e.g., when certain shops are closed) and/or that may be redundant at certain times (e.g., when certain shops have already been contacts by the automated assistant).

In some implementations, the updated customized GUI 174 can include a selectable element that corresponds to a particular entity that the automated assistant has determined would be most helpful to the user 102 based on a context of the spoken utterance 112. For example, although there may be multiple entities (e.g., cake shops) operating near the user 102, there may only be a certain number of entities that are open during the instance of time that the user 102 requested assistance. In accordance with the aforementioned example, the automated assistant can determine that the "Cardinal Bakery" corresponding to the second selectable element 166 is open during the request instance of time (e.g., "tomorrow"). When the user 102 selects the second selectable element 166, the automated assistant can initialize communication(s) between the user 102 and the corresponding entity (e.g., "Cardinal Bakery") and/or the automated assistant and the corresponding entity. Alternatively, or additionally, when the user 102 selects a fourth selectable element 170, the automated assistant can initialize performance of a custom routine that involves performing one or more operations corresponding to any remaining tasks for the activity. For example, in response to selecting the fourth selectable element 170, the automated assistant can show the user 102 popular wedding cake flavors at the display interface 162 (e.g., per the first selectable element 164), then initialize a call with "Cardinal Bakery" (e.g., per the second selectable element 166).

By allowing the automated assistant to identify tasks for a particular activity that a user is interested in, the automated assistant can proactively start and/or complete certain tasks, thereby minimizing an amount of time and/or resources a user may spend on the particular activity. Additionally, when a particular activity involves interacting with another application and/or device that the automated assistant is able to interact with, the automated assistant can reduce an amount of time and energy that may be consumed during such interactions by replacing the user in such interactions. For instance, allowing the automated assistant to make decisions about certain tasks based on contextual data (e.g., a schedule of a user, operating hours of an organization, location of a user, time of day, etc.), the automated assistant is able to eliminate steps that a user may have to manually take when preparing for and/or participating in an activity.

FIG. 2 illustrates a system 200 that provides an automated 204 for proactively identifying and completing tasks associated with a scheduled activity, and rendering a customized GUI that indicates a status of any ongoing tasks. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include a task identification engine 216, which can determine whether a request from a user corresponds to one or more tasks that can be exclusively performed by the automated assistant 204. For example, the user can provide a request to the automated assistant 204 to solicit the automated assistant 204 for assistance with an activity during a subsequent instance of time. Data that embodies the request can be processed by the task identification engine 216 to determine one or more tasks that the automated assistant 204 can perform in the interim in furtherance of preparing for the activity. In some implementations, the tasks can be identified using one or more heuristic processes and/or one or more trained machine learning models using data associated with the user and/or one or more other users.

When a respective task for an activity is identified, the task identification engine 216 can determine how to assist with the respective task. In some implementations, application data 230 can be processed to determine whether one or more applications 234 are capable of assisting the user and/or the automated assistant 204 with one or more of the identified tasks. For example, when a user provides a request such as, "Assistant, help me start a garden tomorrow," the task identification engine 216 can determine that a task of "Identifying nearby Nurseries," may be useful to complete prior to the time (e.g., "tomorrow") that the user asked for help. The task identification engine 216 can invoke a navigation application and/or any other suitable application to initialize performance of one or more operations in furtherance of completing this task. For example, the automated assistant 204 can initialize a search operation via the navigation application to identify "Nurseries" that are within a particular distance from a current location of the user. Therefore, an application 234 can be selected and/or initialized to a particular state based on a current context of the user and/or a context associated with the activity.

In some implementations, the system 200 can include a contextual decision engine 218 that can process contextual data in furtherance of determining a particular application to invoke for a particular task, a particular application state to invoke an application, and/or data to be utilized in furtherance in completing a task. For example, contextual data 236 can indicate a time of day and/or a location of a user (with prior permission from the user) subsequent to the user providing a request for assistance with a particular activity. The automated assistant 204 can determine, based on processing the contextual data 236, whether and/or how to initialize performance of a particular task. For example, when the user is at a particular location subsequent to providing their request, the contextual processing engine 218 can initialize a navigation application and search for entities near that particular location. However, when the user is at another location subsequent to providing their request, the contextual processing engine 218 can initialize the navigation and search for other entities near that other location. Alternatively, or additionally, the contextual processing engine 218 can determine that a particular application and/or application state is suitable to initialize at a certain time based on historical usage data and/or historical interaction data associated with the user and the particular application. However, the contextual processing engine 218 can determine that a different application and/or different application state is suitable to initialize at a different time based on the historical usage data and/or historical interaction data. In some implementations, the historical usage data can indicate that the user previously accessed the particular application and/or application state in a particular context, and that the user previously accessed a different application and/or different application state in a different context. Therefore, the historical usage data can be utilized for determining a particular application and/or application state to utilize for furthering completion of a particular task and/or activity.

In some implementations, the system 200 can include a status generating engine 226 for determining a status of one or more tasks that an automated assistant can perform in furtherance of assisting a user with a particular activity. The status generating engine 226 can process application data 230, device data 232, and/or contextual data 236 to determine a status of a particular task. For example, when the automated assistant initializes communication with a separate entity, the status generating engine 226 can determine status information regarding the interaction between the automated assistant and the separate entity. In some implementations, status data generated by the status generating engine 226 can characterize content of the interactions such as, but not limited to, additional information being requested by the entity, additional information provided by the entity, information provided by the automated assistant, and/or any other information that can be associated with an interaction with an entity.

In some implementations, the system 200 can include a customized GUI engine 234 that can utilize data generated by the status generating engine 226, the task identification engine 216, and/or the contextual decision engine 218 to generate interface data. The interface data can characterize a customized GUI that can be rendered based on a request for the automated assistant to assist the user with an activity during a subsequent instance of time. Using the available data, the automated assistant can dynamically update the customized GUI to indicate a status of each respective task being performed by the automated assistant in furtherance of assisting the user with the activity. In some implementations, the customized GUI engine 224 can generate data characterizing one or more selectable status elements that, when selected, can provide the user with an indication of an ongoing status of one or more tasks. For example, when a user selects a selectable status element corresponding to a search for a nearby entity, a display interface, upon which the selectable status element is rendered, can indicate that the automated assistant is still searching and/or can indicate certain search results identified by the automated assistant.

In implementations, when there is a change to a context associated with the user and/or a task, the customized GUI can be updated accordingly. For example, an application and/or application state can be selected based on a current context of the user. However, when the current context changes, another application and/or another application state can be selected. For example, if a user selects the selectable status element (e.g., being rendered at a home standalone display device) when the user is at a first location, the customized GUI can provide an animation showing search results identified for that first location. However, if the user selects the selectable status element (e.g., being rendered at a vehicle display interface) when the user is at a second location that is different from the first location, the customized GUI can provide an animation showing that the automated assistant is still searching and/or showing search results identified for the second location.

Figure 3:
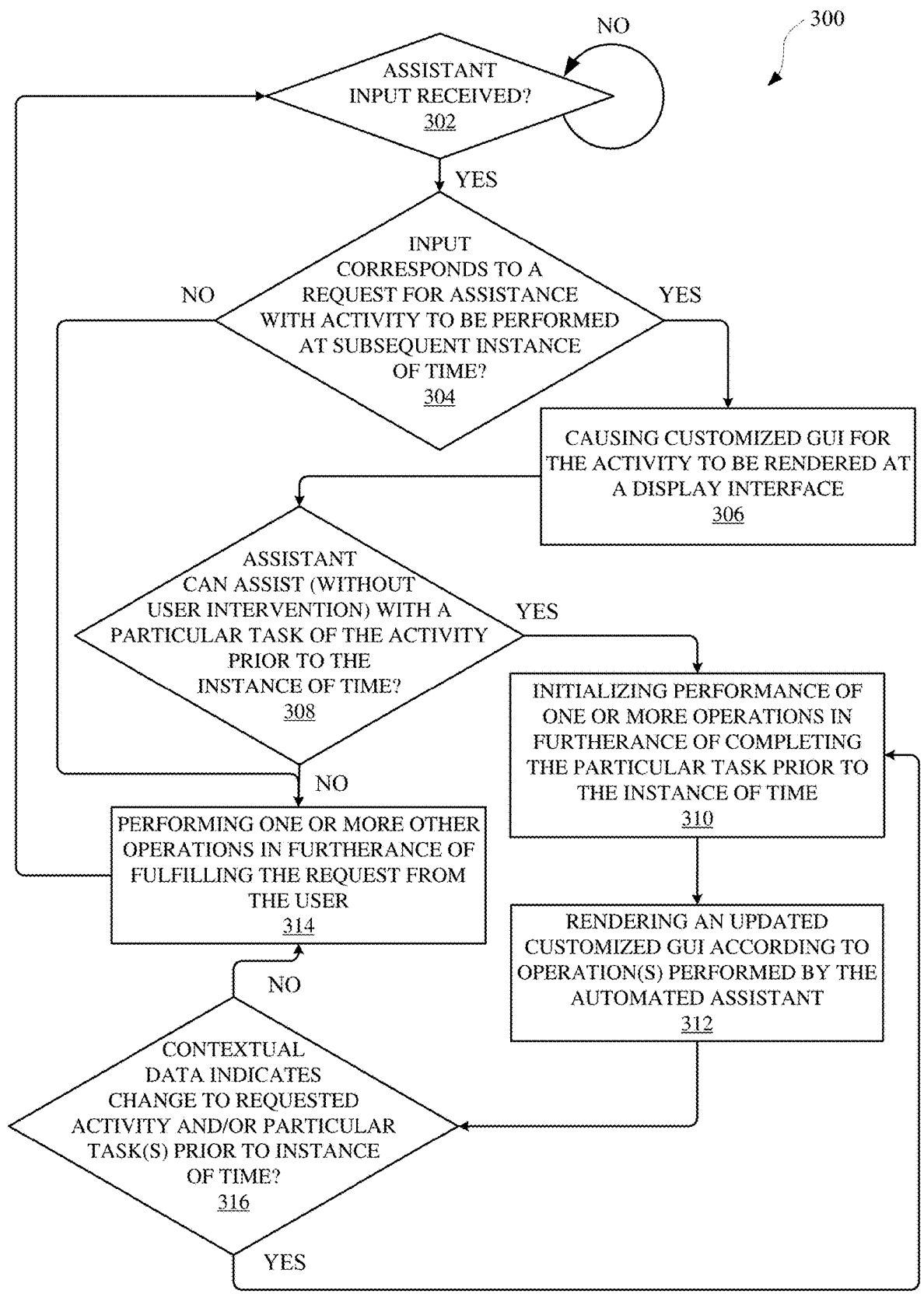
FIG. 3 illustrates a method for operating an automated assistant to provide assistance with performing a particular activity at a particular time by allowing the automated assistant complete certain tasks without user intervention prior to that particular time.

FIG. 3 illustrates a method 300 for operating an automated assistant to provide assistance with performing a particular activity at a particular time by allowing the automated assistant complete certain tasks without user intervention prior to that particular time. The method 300 can be performed by one or more computing devices, applications, and/or any other apparatus or module that can be associated with an automated assistant. The method 300 can include an operation 302 of determining whether a user has provided an input to the automated assistant. The input can be, for example, a spoken utterance and/or other assistant input that can include a request for the automated assistant to perform one or more particular operations. For example, the assistant input can be a spoken utterance such as, "Assistant, help me find a car mechanic tomorrow at 2:00 PM." Audio data characterizing the spoken utterance can be processed to determine one or more operations that the user may be requesting the automated assistant to perform. The method 300 can proceed from operation 302 to an operation 304 when a user input is determined to have been received, otherwise the automated assistant can continue to determine whether a user has provided an input.

The operation 304 can include determining whether the input from the user corresponds to a request for assistance with an activity to be performed at a subsequent instance of time. For example, in accordance with the aforementioned example, the spoken utterance can refer to a request for the automated assistant to assist the user with finding a "car mechanic" during a subsequent instance of time (e.g., "tomorrow at 2:00 PM"). In some implementations, when the user is requesting assistance with an activity, the automated assistant can determine whether the activity includes one or more tasks that, if completed by the automated assistant, can assist the user with the activity. For example, the automated assistant can process data from one or more sources using one or more heuristic processes and/or one or more trained machine learning models to identify other tasks that may be associated with the activity. In some implementations, an embedding can be generated based on the activity and/or related data, and the embedding can be mapped to a latent space in which task embeddings are mapped. A number of tasks can then be identified based on their distance in latent space from the activity embedding to the task embedding(s). For example, tasks identified as being associated with "Finding a car mechanic" can include: (1) using a search engine to identify nearby car mechanics, (2) calling nearby car mechanics to see if they have availability, and (3) getting the malfunctioning car to the car mechanic.

When the user input is determined to correspond to a request for assistance with an activity to be performed during a subsequent instance of time, the method 300 can proceed from the operation 304 to an operation 306. Otherwise, the method 300 can proceed from the operation 304 to an operation 314 of performing one or more operations in furtherance of fulfilling the request from the user. The operation 306 can include causing a customized GUI for the activity to be rendered at a display interface of a computing device (e.g., the computing device to which the user input was directed, or a separate computing device). The customized GUI can include one or more selectable elements, and each selectable element can correspond to a respective task that can be performed in furtherance of assisting the user with the activity.

For example, and in accordance with the aforementioned example, the customized GUI can be rendered with a selectable element that, when selected, causes the automated assistant to initialize performance of an internet search for nearby car mechanics. In some implementations, the selectable element can be rendered with natural language content such as, "Search for Nearby Car Mechanics." As another example, the customized GUI can be rendered with another selectable element that, when selected, causes the automated assistant to initialize a phone call between the user and a particular car mechanic, and/or initialize a phone call between the automated assistant and a particular car mechanic. In some implementations, the other selectable element can be rendered with natural language content such as, "Call Louisville Mechanic Shop."

The method 300 can proceed from the operation 306 to an operation 308, which can include determining whether the automated assistant can assist, without direct, express, and/or indirect user intervention, with a particular task of the activity prior to the instance of time. For example, the automated assistant can determine, based on the identified tasks for the activity, whether one or more of the tasks correspond to one or more actions that can be performed by the automated assistant and/or another application associated with the automated assistant. For instance, the task of performing an internet search for "nearby car mechanics" can be performed exclusively by the automated assistant, and calling nearby car mechanics can be performed using the automated assistant and a separate phone application. When the automated assistant determines that one or more tasks of the activity can be performed by the automated assistant prior to the instance of time, the method 300 can proceed to an operation 310. Otherwise, the method 300 can proceed from the operation 308 to the operation 314.

The operation 310 can include initializing performance of one or more operations in furtherance of completing the particular task prior to the instance of time. In some implementations, the particular task can include initializing communications between the automated assistant and a separate entity that is different from the user and the automated assistant. For example, the separate entity can be a separate application, a separate device, an organization, and/or another person associated with the particular task. In some implementations, the communications can include communicating messages via audio data and/or textual data, in furtherance of completing the particular task. Alternatively, or additionally, the operation 310 can involve the automated assistant interacting with one or more separate applications in furtherance of completing the particular task. For example, automated assistant can communicate with a contractor application in furtherance of scheduling a car mechanic to assist the user. The automated assistant, for example, can also communicate with a calendar application in furtherance of determining whether a particular time when the car mechanic is available corresponds to a portion of a user calendar that includes an entry.

Alternatively, or additionally, the automated assistant can initialize performance of the one or more operations by using a search engine application to identify nearby car mechanics. The automated assistant can then identify one or more search results corresponding to suitable nearby car mechanics and initialize communication with the identified car mechanics. In some implementations, the automated assistant can access schedule data for the user to determine when to schedule a visit with a car mechanic. When the automated assistant has initialized performance of one or more operations in furtherance of completing the particular task prior to the instance of time, the method 300 can proceed from the operation 310 to an operation 312.

The operation 312 can include rendering an updated customized GUI according to the operation(s) performed and/or initialized by the automated assistant. For example, the initial customized GUI rendered at the operation 306 can include a first set of selectable elements with corresponding natural language content and/or other information. In response to the automated assistant initializing certain operations, the initial customized GUI can be updated to include a second set of selectable elements that can indicate a status of certain tasks and/or operations that may have been performed and/or initialized by the automated assistant. For example, the first set of selectable elements can include a selectable element that, when selected, causes a search engine operation to be performed, and the second set of selectable elements can be void of that selectable element. Alternatively, or additionally, the second set of selectable elements may have that selectable element removed, but— that selectable element may be replaced with another selectable element for calling a particular entity (e.g., a car mechanic organization) associated with a search result from the search engine.

The method 300 can proceed from the operation 312 to an operation 316 of determining whether contextual data indicates a change to a requested activity and/or particular task(s) prior to the instance of time when the user requested assistance with the activity. For example, the contextual data can indicate a time of day, a location associated with a user (with prior permission from the user), changes to content that a user is or may be interested in, a change in activity that a user is involved in (e.g., the user was at work but is now out to dinner with friends), and/or any other features of a context that can be associated with a user. In accordance with the aforementioned example, a time of day may change to be outside of certain operating hours indicated by certain entities identified via the search engine results. Alternatively, or additionally, the location of the user can be updated to be less proximate to certain entities and more proximate to other entities identified in the search engine results. When the contextual data indicates a change(s) to the requested activity and/or particular task(s) prior to the instance of time, the method 300 can proceed from the operation 316 and to the operation 310 and/or the operation 312. Otherwise, the method 300 can proceed from the operation 316 to the operation 314 for performing the one or more operations in furtherance of fulfilling the request from the user at, or prior to, the instance of time.

When the method 300 returns to the operation 310, the automated assistant may initialize performance of the one or more operations, and/or one or more other operations in furtherance of completing the particular task prior to the instance of time. For example, when the contextual data indicates that a current time is past an operating time for certain entities, the automated assistant can initialize communication with different entities that may be open at the current time. Alternatively, or additionally, when the contextual data indicates that a vehicle of a user is in a different location (e.g., as determined using data provided by an application corresponding to the vehicle), the automated assistant can initialize communication with particular entities that may be closer to that location than a previous location. Depending on any communication data generated during the interaction between the automated assistant and the different entity, the automated assistant can cause the customized GUI to be updated based on the communication data, per the operation 312.

Figure 4:
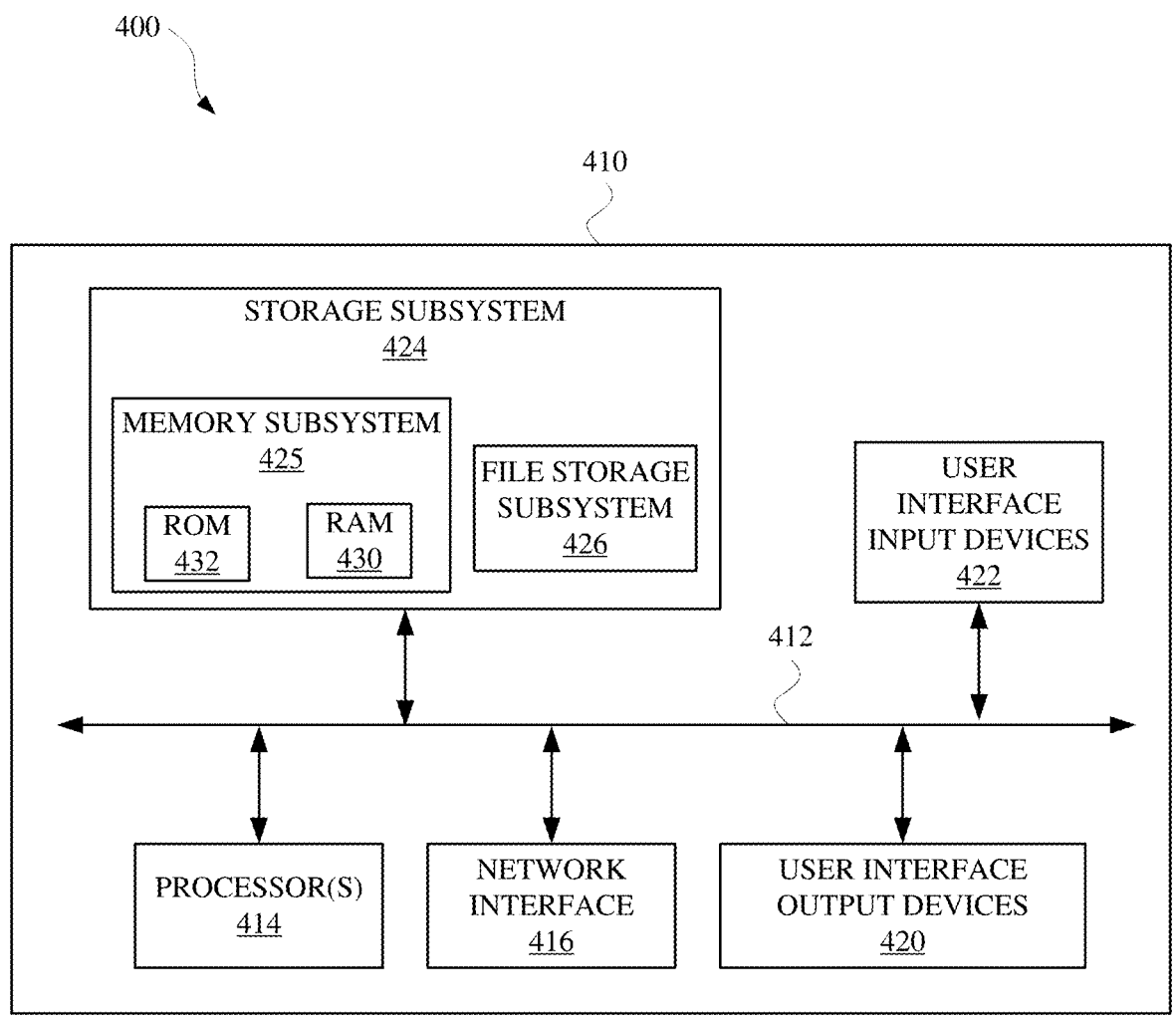
FIG. 4 illustrates a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 400, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random-access memory (RAM) 430 for storage of instructions and data during program execution and a read-only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

A method implemented by one or more processors is set forth as including operations such as receiving, by an automated assistant, a user input that solicits the automated assistant to assist a user with an activity, wherein the automated assistant is accessible via a computing device that is associated with the user. The method can further include determining, based on the user input, that the activity with which the user requested assistance corresponds to one or more tasks, wherein the one or more tasks are determined further based on data that is accessible to the automated assistant. The method can further include causing, by the automated assistant, a display interface of the computing device to render a customized graphical user interface (GUI) that includes one or more selectable elements, wherein each selectable element of the one or more selectable elements corresponds to a respective task of the one or more tasks. The method can further include, subsequent to the customized GUI being rendered at the display interface of the computing device: performing, by the automated assistant and without express input from the user, one or more operations in furtherance of completing a particular task of the one or more tasks, and causing, based on the automated assistant performing the one or more operations, the customized GUI to be modified to indicate a status of completing the particular task of the one or more tasks.

In some implementations, the status of completing the particular task is based on an interaction between the automated assistant and a separate entity that is different from the user. In some implementations, causing the customized GUI to be modified to indicate the status of completing the particular task includes: causing the customized GUI to render one or more additional selectable elements corresponding to one or more additional tasks associated with the activity. In some implementations, causing the customized GUI to be modified to indicate the status of completing the particular task includes: causing a particular selectable element of the one or more selectable elements to be removed from the customized GUI, wherein the particular selectable element corresponds to a particular application that the automated assistant interacted with to further completion of the particular task. In some implementations, wherein causing the display interface of the computing device to render the customized GUI that includes the one or more selectable elements includes: causing a particular selectable element of the one or more selectable elements to be rendered at the customized GUI, wherein the particular selectable element is associated with a first application; and wherein causing the customized GUI to be modified to indicate the status of completing the particular task of the one or more tasks includes: causing an additional selectable element to be rendered at the customized GUI, wherein the additional selectable element is associated with a second application that is different than the first application. In some implementations, performing the one or more operations in furtherance of completing the particular task of the one or more tasks includes: processing contextual data that indicates whether furtherance of completing the particular task is capable of being performed, for a given context, exclusively by the automated assistant.

In other implementations, a method implemented by one or more processors is set forth as including operations such as receiving, by an automated assistant, a user input that solicits the automated assistant to assist a user with an activity during a subsequent instance of time, wherein the automated assistant is accessible via a computing device that is associated with the user. The method can further include communicating, by the automated assistant and prior to the subsequent instance of time, messages with an entity that is separate from the user in furtherance of completing the activity, wherein the messages include a message that is sent from the automated assistant to the entity and an additional message that is received, by the automated assistant and from the entity, responsive to the message. The method can further include generating, based on the additional message received by the automated assistant, status data that indicates a status of completing the activity. The method can further include causing, by the automated assistant and prior to or during the subsequent instance of time, a display interface of the computing device to render a customized graphical user interface (GUI) based on the status data, wherein the customized GUI includes one or more selectable elements, and a particular selectable element of the one or more selectable elements is generated based on the status data and indicates the status of completing the activity.

In some implementations, communicating the messages with the entity that is separate from the user includes: causing an audio call between the automated assistant and the entity to be initialized, wherein the messages correspond to audio data communicated between the entity and the automated assistant during the audio call. In some implementations, communicating the messages with the entity that is separate from the user includes: causing a textual conversation between the automated assistant and the entity to be initialized, wherein the messages correspond to textual data communicated between the entity and the automated assistant during the textual conversation. The method can further include, in some implementations, processing, by the automated assistant, contextual data that indicates that the entity is available for communicating with the automated assistant, wherein the contextual data is provided by an application that is associated with the entity, and is different from the automated assistant.

In yet other implementations, a method implemented by one or more processors is set forth as including operations such as receiving, by an automated assistant, a user input that solicits the automated assistant to assist a user with an activity during a subsequent instance of time, wherein the automated assistant is accessible via a computing device that is associated with the user. The method can further include processing, by the automated assistant, contextual data that characterizes a context of the user subsequent to providing the user input to the automated assistant, wherein the contextual data is processed in furtherance of determining a particular arrangement of selectable elements to render at a display interface of the computing device, or a separate display interface, for assisting the user with the activity. The method can further include, when the contextual data indicates that the user is associated with a first context subsequent to providing the user input: causing a customized GUI to be rendered at the display interface, or the separate display interface, with a first set of selectable elements, wherein each selectable element of the first set of selectable elements corresponds to a respective task of various tasks associated with the activity. The method can further include, when the contextual data indicates that the user is associated with a second context subsequent to providing the user input: causing a disparate customized GUI to be rendered at the display interface, or the separate display interface, with a second set of selectable elements, wherein each selectable element of the second set of selectable elements corresponds to a disparate respective particular task of the various tasks associated with the activity.

In some implementations, processing the contextual data that characterizes the context of the user subsequent to providing the user input to the automated assistant includes: determining, based on the contextual data, a current time of day subsequent to when the user provided the user input, wherein the particular arrangement of selectable elements to render at the display interface, or the separate display interface, is selected based on the current time of day. In some implementations, the user is associated with the first context when the current time of day corresponds to a calendar entry stored by a calendar application associated with the user, and the user is associated with the second context when the current context does not correspond to the calendar entry stored by the calendar application associated with the user. In some implementations, processing the contextual data that characterizes the context of the user subsequent to providing the user input to the automated assistant includes: determining, based on the contextual data, a current location of the user subsequent to when the user provided the user input, wherein the particular arrangement of selectable elements to render at the display interface, or the separate display interface, is selected based on the current location of the user.

In some implementations, the user is associated with the first context when the current location corresponds to a particular location, and the user is associated with the second context when the current location does not correspond to the particular location. In some implementations, a selectable element of the first set of selectable elements includes content provided by a first application, and an additional selectable element of the second set of selectable elements includes other content provided by a second application that is different from the first application. In some implementations, the method can further include, when the contextual data indicates that the user is associated with the first context subsequent to providing the user input: determining to render the first set of selectable elements based on historical usage data indicating that the first application is associated with the first context.

In some implementations, a selectable element of the first set of selectable elements is stored in association with a link that, when selected, initializes an application into a first state, and an additional selectable element of the second set of selectable elements is stored in association with a separate link that, when selected, initializes the application into a second state that is different from the first state. In some implementations, the method can further include, when the contextual data indicates that the user is associated with the first context subsequent to providing the user input: determining to render the first set of selectable elements based on historical usage data indicating that the user previously accessed the first state of the application in the first context. In some implementations, the first context corresponds to a particular time and/or particular location, and the second context corresponds to a separate time and/or separate location.

We claim:

1. A method implemented by one or more processors, the method comprising:
    receiving, by an automated assistant, a user input that solicits the automated assistant to assist a user with an activity a subsequent instance of time,
        wherein the automated assistant is accessible via a computing device that is associated with the user;
    causing, in response to receiving the user input that solicits the automated assistant to assist the user with the activity during the subsequent instance of time, a display interface of the computing device to render a customized graphical user interface,
        wherein causing the customized graphical user interface to be generated includes causing one or more selectable elements to be generated based on the activity, and
        wherein a particular selectable element of the one or more selectable elements is generated based on an initial completion status of the activity;
    communicating, by the automated assistant and prior to the subsequent instance of time, messages with an entity that is separate from the user in furtherance of completing the activity,
        wherein the messages include a message that is sent from the automated assistant to the entity and an additional message that is received, by the automated assistant and from the entity, responsive to the message;
    generating, based on the additional message received by the automated assistant, status data that indicates a status of completing the activity; and
    causing, by the automated assistant, without an additional user input, and prior to or during the subsequent instance of time, the display interface of the computing device to render an updated customized graphical user interface (GUI) based on the status data,
  wherein the updated customized GUI includes one or more updated selectable elements, and a particular updated selectable element of the one or more updated selectable elements is generated based on the status data and indicates an updated completion status of the activity.

2. The method of claim 1, wherein communicating the messages with the entity that is separate from the user includes:
  causing an audio call between the automated assistant and the entity to be initialized,
    wherein the messages correspond to audio data communicated between the entity and the automated assistant during the audio call.

3. The method of claim 1, wherein communicating the messages with the entity that is separate from the user includes:
  causing a textual conversation between the automated assistant and the entity to be initialized,
    wherein the messages correspond to textual data communicated between the entity and the automated assistant during the textual conversation.

4. The method of claim 1, further comprising:
processing, by the automated assistant, contextual data that indicates that the entity is available for communicating with the automated assistant,
  wherein the contextual data is provided by an application that is associated with the entity, and is different from the automated assistant.

5. A method implemented by one or more processors, the method comprising:
  receiving, by an automated assistant at a first particular time, a user input that solicits the automated assistant to assist a user with an activity at a subsequent instance of time,
    wherein the automated assistant is accessible via a computing device that is associated with the user;
  processing, by the automated assistant, contextual data that characterizes a context of the user at the subsequent instance of time,
    wherein the contextual data is processed in furtherance of determining a particular arrangement of selectable elements to render at a display interface of the computing device, or a separate display interface, for assisting the user with the activity;
  when the contextual data indicates that the user is associated with a first context at the subsequent instance of time:
    causing a customized GUI to be rendered at the display interface, or the separate display interface, with a first set of selectable elements,
      wherein each selectable element of the first set of selectable elements corresponds to a respective task of various tasks associated with the activity; and
  when the contextual data indicates that the user is associated with a second context at the subsequent instance of time:
    causing a disparate customized GUI to be rendered at the display interface, or the separate display interface, with a second set of selectable elements,
      wherein each selectable element of the second set of selectable elements corresponds to a disparate respective particular task of the various tasks associated with the activity.

6. The method of claim 5, wherein processing the contextual data that characterizes the context of the user at the subsequent instance of time includes:
  determining, based on the contextual data, a current time of day subsequent to when the user provided the user input,
    wherein the particular arrangement of selectable elements to render at the display interface, or the separate display interface, is selected based on the current time of day.

7. The method of claim 6,
  wherein the user is associated with the first context when the current time of day corresponds to a calendar entry stored by a calendar application associated with the user, and
  wherein the user is associated with the second context when the current context does not correspond to the calendar entry stored by the calendar application associated with the user.

8. The method of claim 5, wherein processing the contextual data that characterizes the context of the user at the subsequent instance of time includes:
  determining, based on the contextual data, a current location of the user subsequent to when the user provided the user input,
    wherein the particular arrangement of selectable elements to render at the display interface, or the separate display interface, is selected based on the current location of the user.

9. The method of claim 8,
  wherein the user is associated with the first context when the current location corresponds to a particular location, and
  wherein the user is associated with the second context when the current location does not correspond to the particular location.

10. The method of claim 5, wherein a selectable element of the first set of selectable elements includes content provided by a first application, and an additional selectable element of the second set of selectable elements includes other content provided by a second application that is different from the first application.

11. The method of claim 10, further comprising:
  when the contextual data indicates that the user is associated with the first context at the subsequent instance of time:
    determining to render the first set of selectable elements based on historical usage data indicating that the first application is associated with the first context.

12. The method of claim 10,
  wherein a selectable element of the first set of selectable elements is stored in association with a link that, when selected, initializes an application into a first state, and
  wherein an additional selectable element of the second set of selectable elements is stored in association with a separate link that, when selected, initializes the application into a second state that is different from the first state.

13. The method of claim 12, further comprising:
  when the contextual data indicates that the user is associated with the first context at the subsequent instance of time:
    determining to render the first set of selectable elements based on historical usage data indicating that the user previously accessed the first state of the application in the first context.

14. The method of claim 13, wherein the first context corresponds to a particular time and/or particular location, and the second context corresponds to a separate time and/or separate location.

* * * * *